United States Patent [19]
McGuckian

[11] 3,966,980
[45] June 29, 1976

[54] METHOD OF COOKING AND STORING FOOD IN FLEXIBLE BAGS

[75] Inventor: Ambrose T. McGuckian, Bethesda, Md.

[73] Assignee: A.G.S. Food System Inc., Greenville, S.C.

[22] Filed: May 2, 1969

[21] Appl. No.: 821,181

[52] U.S. Cl.............................. 426/393; 426/296; 426/412; 426/418
[51] Int. Cl.² ......................................... B65B 25/22
[58] Field of Search ......... 99/174, 194, 192, 171 H, 99/1, 107; 426/296, 412, 393, 418

[56] References Cited
UNITED STATES PATENTS

| | | | |
|---|---|---|---|
| 2,364,049 | 12/1944 | Bensel | 99/193 |
| 2,714,557 | 12/1955 | Mahaffy | 99/174 |
| 2,779,681 | 1/1957 | Sell et al. | 99/107 X |
| 2,825,652 | 3/1958 | Berkowitz | 99/174 X |
| 3,008,837 | 11/1961 | Kaplan | 99/194 X |
| 3,088,290 | 5/1963 | Zearfoss | 99/194 UX |
| 3,132,029 | 5/1964 | Beck | 99/174 |
| 3,169,069 | 2/1965 | Hanson et al. | 99/194 |
| 3,208,851 | 9/1965 | Antinori et al. | 99/194 X |
| 3,262,787 | 7/1966 | Ellis | 99/174 |
| 3,359,122 | 12/1967 | Zebarth et al. | 99/194 |
| 3,597,228 | 8/1971 | Jeppson et al. | 99/107 |
| 3,607,312 | 9/1971 | Ready | 99/107 |

OTHER PUBLICATIONS

Meat Handbook, Levie, Avi Publishing Inc. 1963, pp. 48, 49.
Poultry Processing and Marketing, Apr., 1956, p. 13.
Quick Frozen Foods, June, 1956, pp. 58, 59.

*Primary Examiner*—Steven L. Weinstein
*Attorney, Agent, or Firm*—Cushman, Darby & Cushman

[57] ABSTRACT

A method of cooking foods in vacuum packages, in which the food is encased in a plastic pouch, the pouch is evacuated of air and sealed under high vacuum, the package is immersed in a thermostatically controlled hot water bath to cook the food, then quick chilled and stored at 28°–32°F.

26 Claims, 1 Drawing Figure

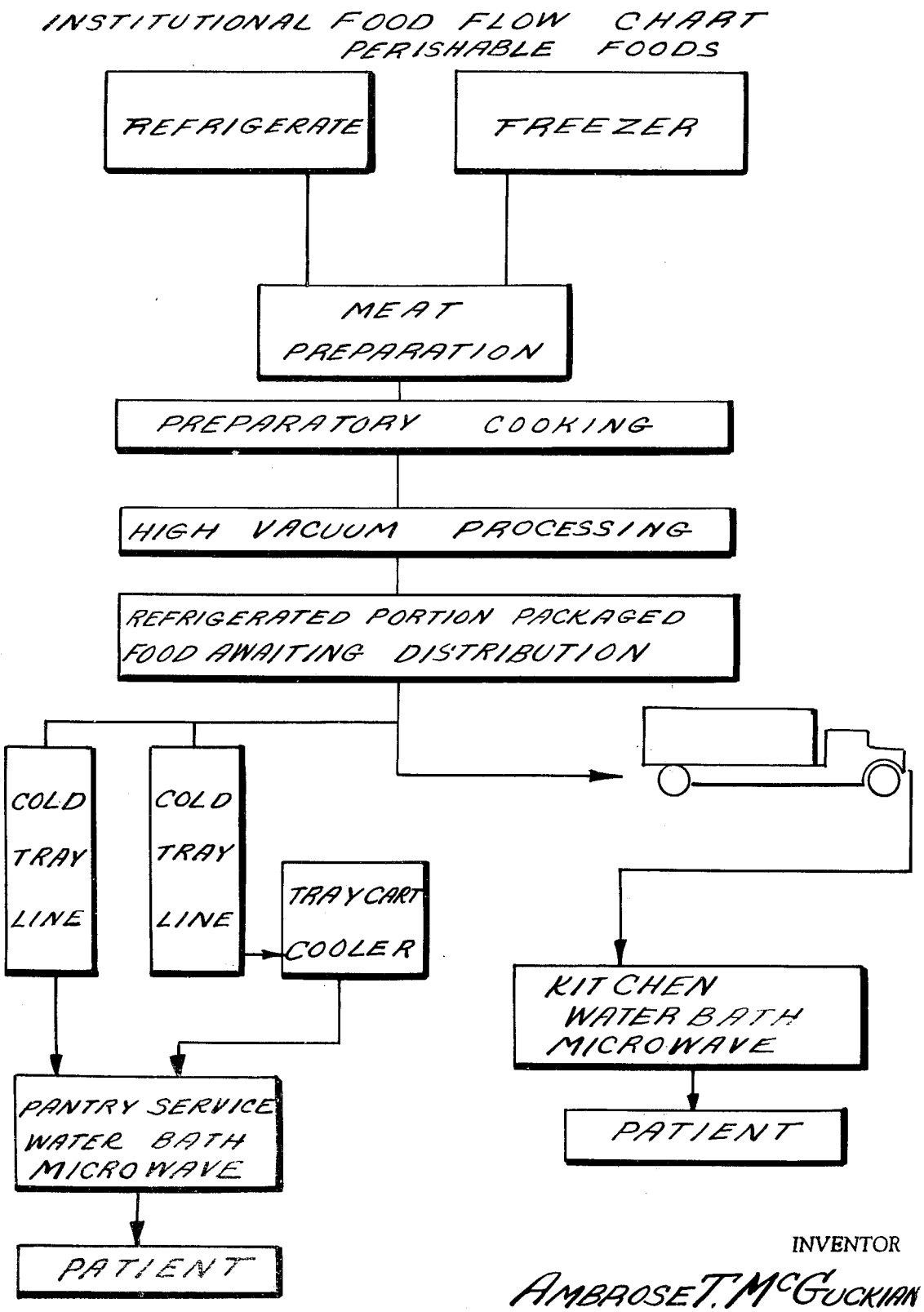

METHOD OF COOKING AND STORING FOOD IN FLEXIBLE BAGS

This invention relates to a system for pasteurizing and cooking raw or partially cooked foods in vacuumed packages, using thermostatically controlled water as the heat element, quick chilling of the product after cooking and holding unfrozen in refrigerated storage at a temperature range of 28° to 32°.

Under this system every menu item in the category of entrees, vegetables and special diet items normally prepared by cooking can be processed retaining the odor and flavor and succulence of freshly prepared food to the time the sealed vacuumed packaged food is reheated and ready for opening and serving, although the results are particularly outstanding with meat such as beef and poultry.

The system has several unique advantages. With the cooking completed within the vacuumed package the aroma, flavor and fresh taste of food is captured and retained until the reheated package is opened at the point of consumption. Nutritional qualities at point of consumption are higher than traditionally prepared food. Processing and storing procedures completely inhibit the growth of harmful bacteria from time of processing to time of consumption and the food has a shelf life of at least sixty days. Problems associated with frozen prepared foods are not apparent in this method; there is no oxidation or dehydration or loss or lack of bloom or bouquet as is noticed in frozen food. Practically every entree or vegetable listed on a menu can be processed satisfactorily.

The method of this invention is particularly advantageous for preparing food for institutional uses, for example, in hospitals, universities, military installations, hotels and restaurants, and schools. In the following description a hospital system is used by way of example.

Getting food to patients at its peak of quality and temperature is a major problem of hospital dietary staffs. Traditional methods of hospital food service have resulted in a spiral of every-increasing costs in food, wages, equipment and supplies without any noticeable improvement in quality standards. Providing patients with acceptable meals meeting minimum temperature requirements, yet avoiding institutional dullness of the served foods is a continuing problem.

Another problem of dietary departments functioning along traditional lines is personnel turnover. Better hours of work and better pay in other job categories causes a never-ending personnel replacement program with its inevitable adverse effect on standards in food preparation, presentation, service and cleanliness. Wage increases have not resulted in any increase in work productivity.

Despite the best efforts of informed specialists and consultants in the field of hospital food service, no major systems improvement in conventional procedures has occurred in the past several years which would substantially increase productivity, retard spiraling food service costs or give patients hotter, more appetizing food, with the possible exception of reheating by microwave.

All known convenience food methods were thoroughly investigated to determine their possible inclusion in the present system. Several economic advantages were noted in hospital use of frozen convenience foods including a standard of quality, a reduction in production personnel, equipment, space and preparation soil. Over-production was minimized and less food was used. Savings were effected when convenience foods replaced conventional foods in low productivity-high cost operations. Patient acceptability was good when quality was good; however, among the disadvantages of frozen foods are: fluctuations in temperature in the channel of distribution have an adverse effect on quality, food bloom or bouquet is less noticeable, menu variety is limited, frozen convenience foods are less than fully responsive to regional tastes and thawing is a continuing problem in time, labor and space.

In the method of the present invention, food is preserved by refrigeration at 28°–32°F, rather than freezing. This offers many advantages: greater flexibility in the types of food that can be processed; refrigeration is less costly than freezing; processing techniques are simpler; changes in food texture, structure and chemistry are minimal. Frozen products require more handling and more time than refrigerated products in their movement from freezer to the tempering refrigerator. Refrigeration preserves the product long enough for orderly consumption if regionally processed.

The present invention by achieving a more effective system of food service through temperature controlled refrigeration just above freezing rather than freezing, meets the following objectives:

a. Procedures are so flexible that every entree and vegetable, including those for special diets, for lunch and dinner can be satisfactorily processed. In other words the menu controls what is to be processed. The system makes use of as broad a spectrum of preparation procedures as found in conventional food preparation.

b. The aroma, flavor and fresh taste of food are captured and retained to the point of consumption.

c. There is complete inhibition of growth of any harmful bacteria from time of processing to time of consumption.

d. There is a shelf life of at least sixty days.

e. There is improved nutritional qualities at point of consumption over traditionally prepared foods.

f. Patients and staff are assured hot satisfying meals.

Basic to the achievement of the aforementioned objectives is the requirement that quality control measures be religiously followed from development of ingredient specifications, to preparation, processing, storing, distributing, reheating and final delivery to the patient.

In developing the present invention it was found that fully cooked foods, vacuum packaged, pasteurized, chilled and held at low refrigerated temperatures for a period of thirty days did not meet required conditions. Of twelve processed items, randomly chosen and taste tested by a test panel, two were considered very acceptable and ten were rated barely satisfactory. "Tired food" best describes the test panel's reaction to food fully cooked before processing.

The solution to this according to the invention is to stop packaging and processing fully cooked food. Instead, the cooking is completed in the pouch after it has been vacuum sealed, thereby capturing and retaining the flavor of food at its peak of excellence followed by keeping at 28°–32°F. until use. Depending on the food item itself, it is used in bulk or may be portioned in one to five portions and vacuum packaged while at various degrees of doneness, such as prior to being fully cooked as with a stewed type item such as meat or chicken pot-pie, or when partially cooked such as fried chicken. Grilled items, such as chopped sirloin steak, are placed on a grill just long enough to sear and give surface color. Some foods are placed in the package raw and completely cooked within the pouch in a temperature controlled water bath.

A description of the present processing system follows: The ingredients for a particular recipe are assembled either raw or partially cooked as prescribed, portioned, packaged under vacuum; then pasteurized and cooked for a specified time in a thermostatically controlled water bath. Then the product is cooled or quick chilled in an ice water tank, then stored at 28° to 32°F, the lowest holding temperature range possible to hold food without freezing. These procedures inhibit the growth of any harmful bacteria and permit a proven shelf life of at least 60 days. The temperature of storing is critical, both higher and lower temperatures being unsatisfactory.

Distribution of the refrigerated food to satellite facilities using the food outside the area of preparation is accomplished according to the invention by means of covered plastic containers with the product surrounded by crushed ice. These food containers are transported in the delivery vehicle of the receiving hospital. Upon receipt at a satellite hospital, food items for the approaching luncheon meal are placed in their sealed pounches in a hot water bath for a period of thirty to forty minutes in advance of service to reach an internal temperature of 160°F. When plated, the entree and two vegetables are energized for ten to twenty seconds in a microwave oven, immediately prior to their distribution to the patient. This microwaving is an insurance measure to make certain that patients get hot food. An optional method to give even greater assurance of heat retention until the patient is ready to eat is to place a compatible plastic film over the plate and contents, then microwave and seal the film around the plate. Care must be taken to use a film that does not produce a chemical odor run off when microwaved.

Patient reaction to the system at the satellite hospital was favorable. Volatile aroma and flavor factors were noticeably present when the patient received his food. It was found that the patient food service was no longer a problem and food costs were substantially less. Dietary personnel like the system — no rush, no fuss, no mess, no pots to clean. Working conditions were quiet and clean. Bacteriological checks have been excellent.

While stress was placed on achieving a better system of hospital food service, better specifically from the patient's point of view, so that food served would compare favorably with the best of home cooking — the economic aspects are also important. Setting the production area of the dietary department up as a manufacturing center will greatly increase productivity in a shorter work span. Seven day requirements can be produced in a five day, forty hour week. Better controls in quality standards and portion sizes are also possible. Meat shrinkage in cooking can be substantially reduced. Special diet items can be produced in quantity, affording substantially savings in man hours. By banking ready prepared food, late trays and new patients can be handled without difficulty and with the expenditure of fewer manhours. The trend toward increased food and labor costs can be arrested.

The invention will be further described with reference to the drawing, which shows a flow chart of the steps of the process as applied to meat. Meat is held in a refrigerator or freezer until ready to be processed according to the invention; it then goes to the meat preparation unit, in which the meat is trimmed, sliced, or boned as necessary and readied for any cooking that may be done prior to sealing in plastic pouches. Next any preparatory cooking, such as grilling beef patties or browning fried chicken, is done, and the meat is then ready for the high vacuum processing step. In this step the meat is encased in a plastic pouch, which is then substantially evacuated of air and sealed under a high vacuum; the pouch containing the meat is then immersed in a hot water bath until the meat is cooked to the desired extent, after which it is immersed in an ice water bath to chill. The next step in the flow chart shows the food in storage refrigeration, held at 28°–32°F, until ready for use. As needed, the food may be removed from the storage refrigerator and distributed, being either transported in refrigerated containers at 28-32°F to satellite facilities, or used at the place of processing, shown in the flow chart at lower right and lower left respectively. In either case, when the food reaches the kitchen, it is placed in a hot water bath, while still in the pouch, for sufficient time to warm it through, and is then portioned and plated for serving.

As needed, the food may be removed from the refrigerated storage and will either go directly to an institutional kitchen, located in the same facility as the food processing unit, or it may be transported to another facility or satellite unit, maintaining the temperature during transport at 28°–32°F. The alternate paths are shown in the flow chart at the bottom left and bottom right, respectively. When ready to be served, the food while in the pouch is warmed in a water bath.

The water acts as a heat transfer means only, and does not come into contact with the food during either the cooking or the subsequent rewarming.

The plastic pouches which are used to encase the food may be of any suitable material that is inert to the food, impervious to air and water, and will remain plastic at the high and low temperatures encountered during processing. A suitable material is Saran (a copolymer of vinylidene chloride with acrylontrile 80:20) or irradiated polyethylene or irradiated polyethylene coated with Saran, polypropylene, etc.

Processing procedures will vary with the menu item. Fried chicken for example will first be deboned of protruding sharp bones which might pierce the plastic type pouch causing leakage. Next seasoned breading mixture is applied. Then the breaded chicken is deep fat fried just enough to set the breading and give the desired color to the chicken about 2–5 minutes. It is then quick chilled, vacuum packaged in portions of one to five pieces and water bath cooked until the internal temperature adjacent to the bone reaches 180°F. With the water bath thermostat set at 200°F the cooking time is 45 minutes. After cooking, the chicken is chilled in an ice water bath to about 32°F and then stored at 28°–32°F. until ready for consumption. To prepare the chicken for eating, it is immersed in a water bath at about 200°F., while still sealed in the pouch, to warm to serving temperature. The chicken may then be dropped into a deep-fat fryer for 1 minute to re-crisp it, since the temperature in the chicken will soften the outside breading while it is in the pouch.

Fresh ground meat is first grilled on a conventional grill just long enough to give surface color and to set the meat to withstand the vacuum pressure. It is then quick chilled, vacuum packaged in portions of one or several portions and cooked until the internal temperature reaches 170°F. With the water bath thermostat set a 200°F processing time is 15 minutes. Raw chicken livers are vacuum packaged five portions to a package and cooked in a 200°F water bath for 30 minutes achieving an internal temperature of 180°F. Canadian bacon is portioned and vacuum packaged five portions to a package and cooked in 200°F water bath for 30 minutes, reaching an internal temperature of 180°F. Other types of pork, such as pork roast are also cooked to an internal temperature of 180°F.

Vegetables also, depending on local tastes, are processed uncooked, as greens; partially cooked, as frozen mixed vegetables; or fully cooked, as canned beans. The same processing procedures may be followed with various seasonings and sauces added prior to vacuum packaging to give each vegetable a distinctive flavor. All are processed until an internal temperature of 180°F. is reached.

According to the method of the invention for cooking beef, both primary and retail cuts, while vacuum packaged are cooked at low temperature in a temperature controlled water bath to achieve maximum tenderness through enzymatic action with minimum loss of meat weight.

Size of a cut of beef processed under this method is only limited by the size of the vacuumed package material that can contain it. Steamship rounds and family sized roasts may be processed with equally satisfactory results.

The cook tank with thermostatically controlled heating elements must be capable of maintaining the desired water temperature with minimum fluctuations of temperature giving steady constant heat penetration from all surfaces of the package.

The preferred thermostatic temperature for beef is between 140°–150°F. more preferably 143° to 148°F. Temperatures within this range with time allowed for complete heat penetration to the center of the mass, usually about 18 hours for a 60–65 lb. roast or 5–7 hours for a 6–10 lb. roast, result in the meat being pasteurized and cooked rare with a minimum loss of meat weight. Shrinkage, using the method of this invention, is about 11–16 percent, as compared with about 25–50 percent when using conventional cooking methods. The meat weight loss is equalized by the weight of extruded natural meat juice captured within the sealed package during the cooking process, for example, the juices usually equal about 15 percent of the weight. This natural beef juice can be used for au jus, stock or gravies. As temperatures increase about 148°F. loss of meat weight increased proportionately.

In setting the thermostatically controlled water bath at the internal temperature which will give the degree of doneness desired, maximum advantage is taken of the tenderizing action of the natural meat enzymes on connective tissue. Therefore, the temperature for cooking beef must be maintained at less than 160°F, at which temperature the enzymes are deactivated. As temperature increases above 148°F. enzymatic action lessens, progressively decreasing the tenderizing effect. One of the novel aspects of the invention is thermostatically setting the temperature at the desired internal temperature of the beef and maintaining it constantly at that temperature through-out the cooking process, in order to make maximum use of the natural enzymes in tenderizing the meat during cooking process and having the same degree of doneness uniform throughout. Thus if an internal cooked temperature of 145°F is desired the thermostat is set at 145°F and that temperature is maintained throughout the cooking process. If the conventional procedure were used enzymatic action and its tenderizing effect would not be nearly as effective and the degree of doneness would not be uniform throughout the cooked meat, it would be more done on the surface. Under the present method beef graded U.S. Good, when cooked will compare favourably with top choice or prime in tenderness and flavor.

Continued cooking after the center of the meat has reached the set temperature will not change the degree of doneness. It will continue to be no more done than the controlled temperature allows. However, enzymatic action will continue increasing the degree of tenderness. It is possible to leave the packaged beef in the water bath too long, with enzymatic action continuing and completely eroding the meat connective tissue, resulting in a complete loss of chewability in the meat. It can become so tender that it will break up in one's mouth.

After cooking is completed the packaged meat is immersed in an ice water bath to draw out the heat, stop the enzymatic action, close the pores, stop the flow of juices and inhibit the opportunity for spore formation and reduce the meat temperature.

When the packaged beef is cooled preferably to an internal temperature of about 34°F. or slightly below it is removed from the chill tank and stored in a refrigerator specially modified to hold at a temperature within the temperature range of 28°–32°F. At this temperature the meat will not freeze and the growth of any harmful bacteria is inhibited. Shelf life is extended far beyond that of meat products held in walk-in refrigerators with temperature conventionally set at 34° to 40°F. Use of low temperature storage of cooked beef at 28°–32°F. is novel with this invention and will help to maintain the natural cooked quality of beef far better than freezing or holding at normally accepted temperatures of 34°–40°F.

Reheating for serving may be by water bath or by conventional methods. Water bath reheating may be done with the meat and juice still vacuumed packaged; or the package can be opened, the juice poured out into a container, seasoned, thickened, possibly colored and simmered. The meat is then portion sliced and placed in a ration pan. Juice in a sufficient amount to keep the meat moist is added. The ration pan is placed in a thermostatically controlled heating unit set to give the desired degree of doneness: rare-medium-well done. Meat processed and reheated as described above has no warmed-over taste.

The process may also be used for the preparation of foods such as chicken pot-pies, beef pot pies and stews as set forth supra.

For pot-pies, the meat and vegetables are first partially cooked separately, for example, by the method of this invention. The meat is then cubed or diced and combined with the vegetables and sauce in a plastic pouch, where the final blending takes place. The pouch is then immersed in a water bath for completion of the cooking, after which it is cooled and stored at 28°–32°F. as described above.

The crusts for the pot pies are prepared and packages separately, then are put on the pie when it is put on the plate for final heating and serving.

The following examples illustrate the invention:

All temperatures are in degrees Fahrenheit.

EXAMPLE 1

A frying chicken which had been cut into 4 serving pieces was deboned to remove any sharp and protruding bones. It was then breaded with a seasoned breading mixture and fried in a deep-fat fryer for just long enough to give it a golden color and set the breading (about 3 to 4 minutes). The chicken was then quick chilled to at least room temperature and put into a plastic Cryovac (saran) pouch. The air was drawn from the pouch under high vacuum and the pouch sealed under vacuum. The pouch with its contents was immersed in a water bath held at 200°F. for 45 minutes, and was then immersed in an ice water bath to chill.

The fried chicken was stored in a refrigerator at 28°–32°F. until ready for use, at which time it was immersed in a hot water bath (200°F) for 30 minutes to warm. It was then removed from the hot water bath, the pouch removed, and the individual pieces of chicken were dropped into a hot deep-fat fryer for 1 minute to crispen the outside.

EXAMPLE 2

A 60 lb. round of beef was encased in a plastic pouch and the pouch was evacuated of air and sealed under low vacuum. The beef in its casing was then immersed in a water bath held at 145°F. and cooked at this temperature for 18 hours. The meat was then chilled in an ice water bath to an internal temperature of 34°F. and stored at 28°F. until ready for use.

The meat was cooked to the rare degree of doneness. If desired, the rare beef after warming in a H₂O bath and removing the pouch may be put into the oven for about ½ hour to give an appetizing color to the outside; if medium or well-done beef is desired, the meat is sliced into portions, which may be placed in a ration pan and juice is added to each portion to keep it moist. The beef is placed in an oven and cooking completed to the desired degree of doneness, at for example, 160°F. for medium and 170°F. for well done.

EXAMPLE 3

A 7 lb. roast of beef was prepared as in Example 2, except that the plastic pouch was sealed under high vacuum, and the roast was cooked for 5 hours. The beef was chilled after cooking as above, and stored at 28°–32°F.

EXAMPLE 4

One pound of raw chicken livers were marinated in buttermilk for ½ hour. The buttermilk was then drained off, and the livers placed in a plastic pouch which was evacuated of air and sealed under high vacuum. The pouch was immersed in a water bath held at 180°F for ½ hour, then chilled in a water bath to a temperature of 32°–34°F. The chicken livers, in the pouch were stored at 28°–32°F. until needed.

There can also be used turkey liver, calves liver, goose liver.

EXAMPLE 5

1 pound of chopped sirloin of beef was formed into 5 equal-sized patties, which were grilled for 1 minute on each side to brown the meat and set the patties so they don't crumble. The beef was then placed in a plastic Cryovac type L (irradiated polyethylene) pouch which was substantially evacuated of air and sealed under high vacuum. The pouch was immersed in a hot water bath with the thermostat set at 200 F, for 15 minutes. The pouch was removed from the hot water bath, chilled in an ice water bath to a temperature of 34°F. and stored in a refrigerator at 28°–32°F.

EXAMPLE 6

1 pound of beef that had been cooked as in Example 2 was cubed to ¾ in. cubes. The beef was combined with ½ pound of peas, ½ pound of diced carrots and ½ pound of diced white potatoes, the potatoes having been boiled for 5 minutes before combining with the other ingredients. A seasoned sauce was added and all ingredients were encased in a plastic pouch which was substantially evacuated of air and sealed under a high vacuum. The pouch was immersed in a hot water bath with the thermostat set at 200°F. for 30 minutes, reaching an internal temperature of 180°F. The pouch was removed from the hot water bath and chilled in an ice water bath to a temperature of 34°F. It was then stored at 28°–32°F.

Pie crust dough was formed into 5 individual potpie crusts, 4½ in. across to form a top crust for each pie. The crusts were baked just until done, cooled and encased in plastic pouches. The pouches were substantially evacuated of air and sealed under a high vacuum. The crusts were then stored at 28°–32°F. When ready for use, the crusts and beef mixture were warmed in a water bath, while still sealed in the pouches. The pouches were then opened and the pies made up on serving plates. Each serving was microwaved for 10–20 seconds after assembling. The pot-pies may also be made with, for example, chicken or turkey, instead of beef.

What is claimed is:

1. A method of preparing and preserving ready-to-eat foods comprising
    a. providing uncooked, edible food for preparation;
    b. vacuum packaging said food in an air and water impervious plastic pouch;
    c. immersing said package in water maintained in the range between 140° to 212°F. until said food is cooked;
    d. quickly immersing said package in chilled water to bring the temperature of the food into the range of 34°F. to 32°F;
    e. maintaining said food at a temperature in the range of 28°F. to 32°F. until needed for consumption;
    f. immersing said package in hot water to bring the food to serving temperatures;
    g. removing said food from the hot water and opening said package; and,
    h. placing said food upon plates and serving.

2. A method for cooking raw or partially cooked foods in vacuum packages, comprising the steps of:
    1. encasing the food in a plastic pouch,
    2. substantially evacuating air from the pouch and sealing under a high vacuum,
    3. immersing the food encased in the pouch in a hot water bath held at a constant elevated temperature for a period of time sufficient to at least partially cook the raw food or further cook the partially cooked food,
    4. removing the packaged food from the hot water bath and chilling it for a period of time sufficient to attain an internal temperature of the food of 32°–34°F. which is above but near the freezing point thereof, and 5. storing the cooked food in the pouch above the freezing temperature of the food and at a temperature of 28°–32°F.

3. The method of claim 2, wherein the food to be cooked is selected from beef and poultry.

4. The method of claim 2, wherein the food to be cooked is the filling for a pot-pie, consisting essentially of partially cooked diced meat which has been combined with diced vegetables and a sauce.

5. The method of claim 2 including the additional step of reheating for serving by heating the stored food in the pouch in a water bath at a thermostatically controlled temperature.

6. A method according to claim 2 wherein the hot water bath is maintained at a temperature not over 200°F.

7. The method of claim 2, wherein the food to be cooked is raw beef, and the temperature of the hot water bath in which the food is cooked is 140°–150°F.

8. The method of claim 7, wherein the temperature of the hot water bath is 143°–148°F.

9. The method of claim 2 wherein the food to be cooked is chicken which has been coated with a breading mixture and fried in deep fat for two to five minutes.

10. The method of claim 9, wherein the temperature of the hot water bath is 200°F. and the chicken is immersed in the water bath for a period of time sufficient to be cooked completely.

11. A method according to claim 2 wherein the chilling to 32°–34°F. is in an ice water bath.

12. A method according to claim 11 wherein the food to be cooked is raw beef and the temperature of the hot water bath in which the food is cooked is 140°–150°F.

13. The method of claim 2 wherein the food to be cooked consists essentially of raw beef.

14. The method of claim 13 wherein the cooking is done in a hot water bath at 140°–150°F.

15. The method of claim 14 including the additional step of reheating for serving by heating the stored beef in the pouch in a water bath at a thermostatically controlled temperature.

16. A method according to claim 2 consisting essentially of the steps set forth.

17. A method according to claim 16 wherein the food to be cooked is raw beef.

18. A method according to claim 17 wherein the temperature of the hot water bath in which the food is cooked is 140°–150°F.

19. A method of preparing and preserving ready-to-eat foods comprising
  a. providing edible food for preparation,
  b. vacuum packaging said food in an air and water impervious plastic pouch,
  c. heating until the internal temperature of said food is 140° to 180°F.,
  d. quickly chilling said food to a temperature in the range between 34°F. and 32°F.,
  e. maintaining said food at a temperature in the range between 28°F. and 32°F. until it is needed for consumption; and
  f. heating said food for serving.

20. A method according to claim 19 consisting essentially of the steps set forth.

21. A process according to claim 19 wherein the quick chilling is at 32°F.

22. A process according to claim 19 wherein the quick chilling is at 34°F. and the food is then reduced to a temperature in the range between 28°F. and 32°F. and thereafter maintained at between 28°F. and 32°F. until it is needed for consumption.

23. The method of claim 19 wherein each of the two heating steps is performed by immersing said vacuum packaged food in heated water.

24. The method of claim 23 wherein the water temperature is between 140°F. and 200°F.

25. The method of claim 24 wherein the chilling step is performed by immersing said vacuum packaged food in chilled water.

26. The method of claim 25 wherein after the chilling step, said vacuum packaged food is reduced to and maintained at a temperature of approximately 28°F.

* * * * *